Patented June 22, 1937

2,084,506

UNITED STATES PATENT OFFICE 2,084,506

PROCESS FOR PREPARING IMPROVED DETERGENTS AND WETTING AGENTS FROM PETROLEUM OILS AND PRODUCTS THEREOF

Raphael Rosen, Cranford, N. J., assignor to Standard Oil Development Company, a corporation of Delaware No Drawing. Application November 9, 1934, Serial No. 752,313

8 Claims. (Cl. 260—159)

This invention relates to methods for preparing improved wetting agents and detergents from petroleum oils and more particularly to improved sulfuric derivatives obtained by the treatment of petroleum oils with fuming sulfuric acid under conditions avoiding polymerization and oxidation.

In the refining of petroleum oils with strong or fuming sulfuric acid at room or higher temperatures, substantial oxidation and polymerization of the more active components of the oil occurs as evidenced by the formation of pitch-like and tarry sludges and by the liberation of sulfur dioxide fumes. Sulfonic acid derivatives of the hyrocarbons may be separated from both the treated oil and the sludge by known methods and the sulfonates produced by neutralizing these acids with alkalis have been proposed for use as wetting agents and detergents. These sulfonates, however, have not a very high wetting or cleansing power and are also extremely difficult to obtain in a purified form. Their use is accordingly limited principally to crude industrial applications.

It has now been found that a superior class of sulfuric derivatives is prepared by treating petroleum oils and fractions thereof with fuming sulfuric acid at low temperatures below about 32° F. and preferably below about 20° F. The treatment also results in marked savings in the oil as no appreciable oxidation occurs and no substantial amounts of pitch-like sludge are formed. By this process it is believed that the more unstable components of the oil, which would be polymerized by treating at higher temperatures, are converted into sulfuric derivatives and are obtained as a valuable product instead of being lost. The products obtained according to the present invention are superior in wetting and detergent power, in color and in solubility in water to those obtained at higher temperatures. The process is also believed unique in that on neutralization there is practically no formation of preferentially oil-soluble sulfuric derivatives and the subsequent refining of the treated oil is accordingly simplified.

Petroleum oils which may be treated according to this invention include petroleum crudes, such as Peruvian, Colombian, Russian, California, Ranger-Burbank, and Mid-Continent, and fractions thereof, obtained by distillation and/or by the use of selective solvents to concentrate the more readily acid-reactive components, averaging above about eight carbon atoms per molecule, including lubricating and white oil stocks, kerosene fractions and pure hydrocarbons such as decane and higher paraffins and naphthenes, such as cyclodecane and alkylated naphthenes such as butyl cyclodecane. Naphthenic oils, such as those obtained from Peruvian and Colombian crudes, are preferred. It is also desirable that the oils be free of asphaltic matter. Such oils may be prepared by preliminary treatment with acid, clay, or with selective solvents, such as propane, by hydrogenation or by distillation of crudes and fractions thereof. This invention does not apply to the treatment of cracked oils containing olefines, as these are covered in a copending application, Serial No. 752,286, filed Nov. 9, 1934, by Per K. Frolich. The oil stocks used in this invention are also preferably free of water which can be removed by treatment with fresh or partly spent sulfuric acid or by careful heating or distillation. Oils containing substantial amounts of wax, such as Pennsylvania and Mid-Continent oils are preferably first dewaxed to permit treatment at low temperatures without solidification, or else the treatment is conducted in the presence of large quantities of inert diluents such as carbon tetrachloride, methyl alcohol, ether, naphtha, etc.

The fuming sulfuric acid may be of any desired strength, and is preferably of such strength to be liquid at the reaction temperature used. Suitable strengths are about 5 to 25% sulfuric anhydride, but lower or higher concentrations, for example, 65% sulfuric anhydride, may be used.

This invention is illustrated by the following example which is presented solely for purpose of illustration and is not to be considered as limiting the invention.

*Example 1.*—A lubricating distillate having a viscosity of 90 to 100 sec. Saybolt at 100° F. is prepared by treating a distillate fraction of a Mid-Continent crude with about 16 lbs. per barrel of sulfuric acid of 98% strength. The acid-treated oil is neutralized with soda and is then reduced, preferably by steam distillation, to the desired viscosity. Wax is removed by any suitable method such as filtration, centrifugal separation, etc. preferably in the presence of dewaxing solvents.

Ten gallons (70 lbs.) of this dewaxed lubricating distillate is cooled in an agitator to 15° to 20° F. and 7 pounds of fuming sulphuric acid containing 30% sulphur trioxide is then added slowly with stirring and cooling to avoid rise in temperature. The reaction mixture is then diluted carefully with ice in order to lower the concentration of the residual acid to about 60% (based on total sulphuric acid and water present) before the temperature is permitted to rise above about 32° F. The mixture is allowed to stand and the residual aqueous acid settled as a lower layer and is drawn off, leaving in the agitator oil and sulphuric acid derivatives along with a small percentage of free sulphuric acid. An aqueous solution containing 15% caustic soda is then used to neutralize this mixture. It is added slowly with stirring and cooling to keep the mixture at about 32° F. until approximately 10% of the sulphuric acid derivatives are neutralized, after which the mixture is allowed to warm up to a temperature not higher than 100° F. during the remainder of the neutralization. Five gallons of 91% aqueous isopropyl alcohol is added to aid separation of the resulting emulsion, and the mixture on standing separates into three layers consisting of an upper layer of oil, a middle alcoholic solution of sodium salts of the sulphuric acid derivatives, and a bottom layer of aqueous salt solution. The middle layer containing the desired soaps is removed and dried in a drum dryer, whereupon 13.5 lbs. of a dry light-colored soap having both wetting and detersive properties are obtained.

When more viscous oils are used than that shown in the above example, the dilution of the residual acid to 60% concentration does not form a mixture from which the free acid separates readily. The time required for this separation may be shortened by the use of a centrifuge. The necessity of the separation may be avoided by neutralizing the total reaction mixture directly with caustic soda while maintaining the temperature of the mixture in the same ranges as shown for the neutralization step in the above example. Alcohol is added to the neutralized mixture as in the above example, whereupon most of the sodium sulfate is removed in the aqueous bottom layer. A salt free soap may be obtained by increasing the concentration of alcohol in the alcoholic soap solution to above 80% whereby the remaining salt is thrown out of the solution.

If the temperatures are permitted to rise materially above the upper limits described above, oxidation and polymerization sets in and the resulting soaps are much inferior in color and in wetting and detergent characteristics and are less soluble.

Other acid-reactive materials suitable for the preparation of sulfuric derivatives of value as detergents, wetting agents, emulsifiers, etc., may be added during the reaction to prepare mixed soaps. Pure olefines, cracked oils and waxes, alcohols, partly oxidized oils and waxes and fractions thereof are among such reagents.

The production of sulfuric derivatives of the petroleum oils is preferably conducted under conditions at which no appreciable formation of polymerization products, tars or pitch-like acid sludges occurs. The maximum treating temperature depends upon the time of contact and the type of materials treated. The preferred maximum temperature of about 32° F. applies when the reaction is conducted in batch, that is, by mixing the acid and oil in a reaction vessel for a period of time, say 30 minutes to several hours. Somewhat higher temperatures may be used when the time of contact is limited to less than about 5 or 10 minutes, as is obtained in mixing flowing streams of oil and acid in a turbo mixer and immediately removing excess acid from the reaction mixture by dilution with water. The separation of acid may also be accelerated by passing the reaction mixture into a centrifuge. It is generally desirable to conduct the treatment of all oils with an excess of fuming sulphuric acid above that required for substantially complete reaction at the temperature used, to remove the unreacted sulphuric anhydride from the reaction mixture and to reduce the strength of sulphuric acid below about 50% in the reaction mixture before the temperature is raised. This may be accomplished either by dilution with water or by neutralization with an alkali.

Soaps of the sulphuric acid derivatives may be readily obtained by neutralization with a suitable base, such as basic compounds of the alkali metals, ammonium and also the amines, alkylamines, alkylolamines and other organic bases. The soaps obtained from clean fractions of oil according to the preferred methods described herein are usually of suitable purity and color for immediate use. However, if dirty stocks are used, or treating or drying temperatures are permitted to run too high, discolored products may result. These may be purified by treatment with clay, active carbon, by salting out of saturated salt solutions with sodium chloride or sulphate, by treatment with peroxides, and other soap refining practices. The addition of soluble calcium salts to an aqueous solution of discolored alkali soaps also serves to precipitate the color bodies. The precipitate may be removed by settling, filtration, etc., and a light colored soap recovered from the remaining solution by drying, solvent extraction, salting out, and like methods.

The sulphuric derivatives and the neutralized products or soaps obtained therefrom, are especially suitable for use as valuable wetting agents. They may also be used as detergents, tanning agents, emulsifiers, emulsion breakers, and generally in whole or partial substitution for ordinary fat acid soaps and for the "green", or water soluble, sulphonates. They may also be used in admixture with other wetting agents, detergents and emulsifiers, such as the ordinary petroleum acid sludge sulphonates, the mahogany or oil-soluble sulfonates, sulphates of fatty alcohols, hydroxy acids and the like, fatty acid soaps, alkalies such as washing soda and ammonia, fillers, abrasives, dyes, perfumes, organic solvents and other addition products in the preparation of wetting and cleansing compositions, laundry and toilet preparations, bar soaps, soap powders, liquid soaps, dry cleaner soaps, and like compositions.

These sulphuric derivatives may also be used generally as improved substitutes for the water soluble sulphonic acids and sulphonates heretofore obtained from acid treating of petroleum oils under ordinary conditions. They may also be used in rubber, ink, paint and toxic compositions. For example, the copper and mercury compounds of these sulphuric derivatives may be used as germicides, fungicides, and weed killers.

This invention is not to be limited to any illustrations, examples or theoretical explanations which have been presented herein solely for purpose of illustration, but is limited only by the following claims in which it is desired to claim all novelty insofar as the prior art permits.

I claim:

1. Process for preparing improved sulfuric derivatives comprising treating an uncracked petroleum oil fraction averaging more than about 8 carbon atoms per mol., with fuming sulphuric acid at a reaction temperature below about 32° F. in the absence of sulfur dioxide and separating the resulting sulphuric derivatives of hydrocarbons from the reaction mixture.

2. Process for producing improved wetting agents and detergents according to claim 1 in which the said sulphuric derivatives are neutralized with a suitable base to form a soap.

3. Process according to claim 1 in which said oil fraction is a distillate fraction of petroleum.

4. Process according to claim 1 in which said temperature is below 20° F.

5. Process for preparing improved wetting agents and detergents comprising treating an uncracked lubricating oil fraction of petroleum with fuming sulphuric acid at a temperature below about 32° F. in the absence of sulphur dioxide and neutralizing the resulting sulphuric derivatives to form soaps.

6. Process according to claim 5 in which said oil is first treated with concentrated sulphuric acid and the resulting sludge is separately removed before the said fuming acid treatment.

7. Process according to claim 5 in which said oil is dewaxed before said fuming acid treatment.

8. Process according to claim 5 in which said temperature is below 20° F.

RAPHAEL ROSEN.